Figures 1, 2:
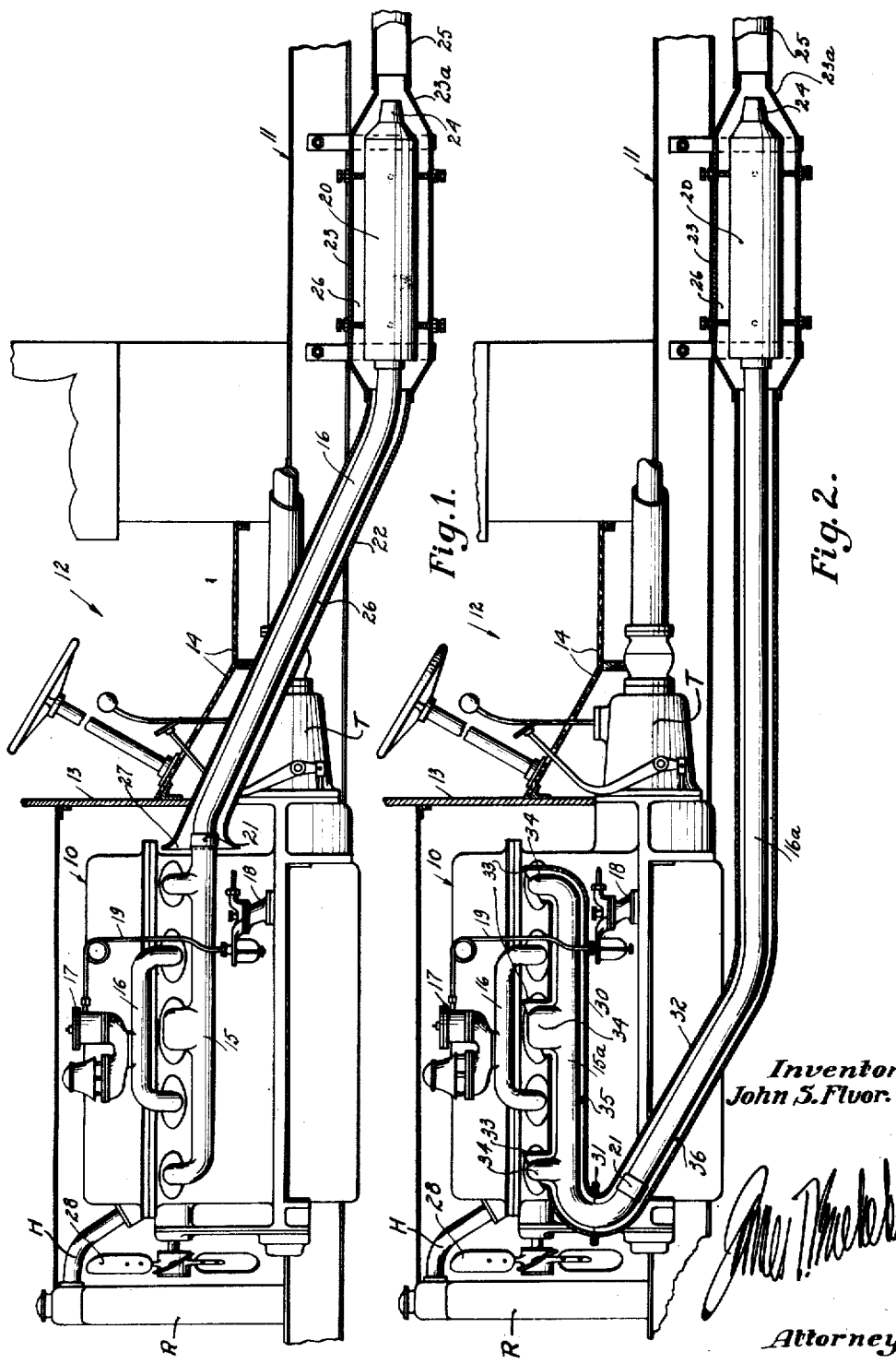

Nov. 29, 1938.        J. S. FLUOR, JR        2,138,001
ENGINE AND EXHAUST PIPE COOLING SYSTEM
Filed Sept. 28, 1936

Inventor.
John S. Fluor, Jr.

Attorney.

Patented Nov. 29, 1938

2,138,001

UNITED STATES PATENT OFFICE 2,138,001

ENGINE AND EXHAUST PIPE COOLING SYSTEM

John S. Fluor, Jr., Santa Ana, Calif., assignor to The Fluor Corporation, Ltd., Los Angeles, Calif., a corporation of California Application September 28, 1936, Serial No. 102,878

8 Claims. (Cl. 180—54)

This invention has for its primary object to provide a simple and effective system for reducing temperatures in vehicles driven by internal combustion engines, and particularly for removing heat from the exhaust pipe and manifold to avoid excessive heating of the vehicle body. It will be understood that the invention is generally applicable to engine driven vehicles of all types and including automobiles, trucks, dieselized trains, and the like.

In accordance with the invention in its preferred form, I provide for the removal of heat from the vicinity of the exhaust manifold and exhaust pipe, through a conduit that jackets the exhaust pipe and muffler, and within which an induced air draft is created by the muffler discharge. The jacketing conduit may or may not be placed entirely about the exhaust manifold, as desired. Preferably the conduit inlet will be positioned toward the rear end of the manifold so as to intercept the heated air at a point in advance of the vehicle cab or body, and thus prevent the latter from becoming heated to any objectionable temperatures. I also preferably position the conduit inlet, when the entire exhaust manifold is not jacketed, about and toward the rear of the manifold for the reason that the engine fan, and also forward motion of the vehicle, tend to cause the engine heated air to flow generally in the longitudinal direction of the exhaust manifold and toward the conduit inlet. These air circulating influences together with the induced draft into the conduit, cause the heat to be rapidly carried away and the temperatures outside the engine to be greatly lowered. Not only is the vehicle body kept cool, but many exterior parts of the engine as well. For example, and as will later appear, parts of the fuel feeding system are kept sufficiently cool that such commonly encountered difficulties as vaporization in the liquid fuel lines, are overcome.

The invention will be more fully understood and explained to better advantage from the following detailed description of the invention in certain of its typical and illustrative forms. Throughout the description reference is had to the accompanying drawing, in which:

Fig. 1 is a general view, partly in section, showing the invention in one of its typical and preferred forms; and Fig. 2 is a view similar to Fig. 1, illustrating a variant form of the invention.

In the drawing, I have shown a fragmentary and forward portion of a typical vehicle chassis, for example a truck chassis comprising the conventionally illustrated internal combustion engine 10 mounted on the frame side rails 11, and the cab structure, generally indicated at 12, including the forward wall 13 and floor boards 14. The engine 10 is shown to include the usual exhaust manifold 15, intake manifold 16 and carbureter 17 to which fuel is supplied from the pump 18 by way of line 19. The exhaust manifold 15 connects with the usual exhaust pipe 16 extending rearwardly of the vehicle to the muffler 20, which may be of any of the conventional design. In the drawing I have shown the usual type of water cooled engine, the radiator being designated at R and the hose connection with the engine at H. Characteristic of water cooled engines, excessive temperatures due to heat radiation from the exposed main body of the engine are avoided by the engine being cooled with circulating water. Consequently, the only part of the engine from which the radiation of heat may become sufficiently intense as to cause the cab or driving compartment 12 of the vehicle to become excessively heated, is the exposed exhaust gas manifold 15. Accordingly, the invention has been made particularly with the view of effectively removing the warm air from the intense heat zone in the immediate vicinity of the exhaust manifold.

As previously mentioned, one of the commonly experienced difficulties that the invention is particularly intended to overcome, is excessive heating of the vehicle cab or body as a result of heat conducted from the engine through the forward and bottom walls of the cab. Being located in close proximity to the engine, the forward wall 13 of the cab ordinarily is insulated to reduce the conduction of heat into the cab, but the common experience has been, especially in hot weather and with trucks operating at high engine speeds, that the cab cannot be kept desirably cool simply by the use of wall insulation. Since the engine is hottest at the exhaust manifold and exhaust pipe, some reduction in the heat conducted to the cab has been effected by extending the exhaust pipe downwardly from the forward end of the exhaust manifold, as illustrated in Fig. 2 wherein the exhaust pipe 16a is shown to connect at 21 with the forward extended end of the exhaust manifold 15a. In this way the cab temperatures are reduced by keeping the exhaust pipe as far away as possible from the wall 13 and floor boards 14. Even this expedient, however, is incapable of keeping the temperatures as low as to be desired.

The invention affords a simple and effective means for removing heat from the engine, and directly from the exhaust manifold, by providing a conduit, preferably placed about the exhaust pipe, through which the hot air is drawn from the engine at a point forward of the cab walls, so that the latter are kept comparatively cool. Referring to the form of the invention shown in Fig. 1, the exhaust pipe 16 is jacketed by a conduit 22 connecting at its rear end with an enlarged diameter jacket 23 containing the muffler 20, jackets 22 and 23 being annularly spaced about the exhaust pipe and muffler to provide an open air duct 26. As illustrated, jacket 22 extends below floor wall 14 of the driving compartment 12, and, following along and directly surrounding the exhaust pipe 16, is offset to one side of the transmission T. The muffler outlet 24 discharges the combustion gases through the tapered end 23a of the muffler jacket and into the muffler tail pipe 25, the gas discharge from the muffler acting to create an induced draft through passage 26 from the forward end of conduit 22. Heat conduction from the exhaust pipe and muffler to the body of the vehicle is minimized by the presence of the insulating air space 26 between the exhaust pipe, muffler and jacket, and also by the air stream flowing through the conduit and rapidly carrying away the heat conducted from the surfaces of the exhaust pipe and muffler. The heated air stream is discharged through the tail pipe 25 along with combustion gases from the muffler.

It will be understood that any desired length of the exhaust manifold and exhaust pipe may be jacketed by the conduit 22, although for most purposes I prefer to leave the greater portion of the exhaust manifold exposed, and to arrange the air jacket inlet in such position that the heated air is drawn into it directly from and along the exhaust manifold. Also, in most installations, I prefer to locate the air conduit inlet toward the rear of the exhaust manifold in view of the fact that the general direction of air flow in the vicinity of the exhaust manifold, as produced by the engine fan and forward motion of the vehicle, is toward the rear. Accordingly, the air conduit inlet 27 may be positioned, as illustrated, concentrically about the rear end of the exhaust manifold, and flared or otherwise enlarged to substantially increase its area.

The engine fan 28 together with the induced draft in the air conduit, set up a rapid flow of the heated air in the vicinity of the exhaust manifold, toward the rear and directly into the enlarged inlet 27. Thus the extreme heat at the manifold is immediately carried away and prevented from reaching the cab walls at a temperature sufficiently high to be objectionable. As a matter of fact, in vehicles to which the invention has been applied, the wall 13 and floor boards 14 have been found to remain sufficiently cool as to require no insulation. Also it has been found that the removal of heat from the general vicinity of the exhaust manifold is sufficiently rapid that the fuel line 19 is kept well below the temperature to which vaporization in the line and resultant "vapor lock" can occur.

If desired, the air jacket may be extended to enclose the manifold itself, as well as the exhaust pipe. Thus, as shown in Fig. 2, the air jacket 30 connected at 31 to pipe 32, is shown to be placed about the manifold 15a, the jacket having air inlets 33 about the manifold branches 34 and spaced therefrom so that the air is drawn downwardly into the space 35 between the jacket and manifold and thence into the air duct 36 between pipes 16a and 32. The inlets 33 may be inclined in the direction of the fan, as illustrated, so as to form baffles that deflect the air stream flowing from the fan, downwardly into the jacket passage.

The described exhaust manifold is readily applicable to any standard motor vehicle driven by a water cooled engine. For example, installations of the exhaust pipe and muffler jacket have been made in trucks, the driving compartments of which ordinarily cannot be kept desirably cool due to the high speeds at which the engines are required to operate and the resultant excessive manifold temperatures. Heated air from the immediate vicinity of the exhaust manifold has accomplished satisfactory lowering of the driving compartment temperatures, notwithstanding the radiation and convection of heat from other parts of the engine, for the reason that the main body of the engine is adequately cooled by the circulating water. The invention has the further practical advantages of being readily installed without interfering with the normal arrangement of the engine parts, and in a manner such as will leave the body of the engine exposed and fully accessible for inspection and repair.

Other arrangement of the air jacket relative to the manifold and exhaust pipe may be utilized to produce the described cooling effects, and it will be understood therefore that the drawing is to be regarded as illustrative of the invention in certain of its typical forms, and that changes and modifications may be made without departure from the essential aspects of the invention.

I claim:

1. In an engine driven vehicle including a water cooled internal combustion engine, a driving compartment having a floor wall and a vertically extending wall at the rear of the engine, and an exhaust pipe extending rearwardly from the engine exhaust manifold; a conduit outside the walls of said compartment and directly surrounding and following the exhaust pipe, said conduit having an air inlet positioned to receive heated air from the immediate vicinity along the exhaust manifold but leaving the main body of the engine openly exposed beyond said inlet, and means for communicating suction to said conduit to draw the heated air from said exhaust manifold into and through the conduit.

2. In an engine driven vehicle including a water cooled internal combustion engine, a driving compartment having a floor wall and a vertically extending wall at the rear of the engine, and an exhaust pipe extending rearwardly from the engine exhaust manifold; a conduit outside the walls of said compartment and directly surrounding and following the exhaust pipe, said conduit having an air inlet positioned rearwardly of the front end of the engine to receive heated air from the immediate vicinity along the exhaust manifold but leaving the main body of the engine openly exposed beyond said inlet, and means for communicating suction to said conduit to draw the heated air from said exhaust manifold into and through the conduit.

3. In an engine driven vehicle including a water cooled internal combustion engine, a driving compartment having a floor wall and a vertically extending wall at the rear of the engine, and an exhaust pipe extending rearwardly from the engine exhaust manifold; a conduit outside the walls of said compartment and directly surrounding and following the exhaust pipe, said conduit having an air inlet positioned to receive heated air from the immediate vicinity along the exhaust manifold without directing air against the engine and leaving the main body of the engine openly exposed beyond said inlet, and means for communicating suction to said conduit to draw the heated air from said exhaust manifold into and through the conduit.

4. In an engine driven vehicle including a water cooled internal combustion engine, a driving compartment having a floor wall and a vertically extending wall at the rear of the engine, and an exhaust pipe extending rearwardly from the engine exhaust manifold; a conduit outside the walls of said compartment and directly surrounding and following the exhaust pipe, said conduit having an air inlet positioned at the rear of the exhaust manifold to receive heated air from the immediate vicinity along the exhaust manifold but leaving the main body of the engine openly exposed beyond said inlet, and means for inducing suction within said conduit by virtue of the discharge of gas from said exhaust pipe, to draw the heated air from said exhaust manifold into and through the conduit.

5. In an engine driven vehicle including a water cooled internal combustion engine, a driving compartment having a floor wall and a vertically extending wall at the rear of the engine, a muffler, and an exhaust pipe extending rearwardly from the engine exhaust manifold to said muffler; a conduit outside the walls of said compartment and directly surrounding and following the exhaust pipe and muffler, said conduit having an air inlet positioned to receive heated air from the immediate vicinity of the exhaust manifold but leaving the main body of the engine opening exposed beyond said inlet, and means for inducing suction within said conduit by virtue of the discharge of gas from said exhaust pipe, to draw the heated air from said exhaust manifold into and through the conduit.

6. In an engine driven vehicle including a water cooled internal combustion engine having a rearwardly extending transmission, a driving compartment having a floor wall and a vertically extending wall at the rear of the engine, and an exhaust pipe extending rearwardly from the engine exhaust manifold; a conduit extending below said floor wall and offset to one side of said transmission, said conduit directly surrounding and following the exhaust pipe and having an inlet positioned to receive heated air from the immediate vicinity of the exhaust manifold but leaving the main body of the engine openly exposed beyond said inlet, and means for inducing suction within said conduit by virtue of the discharge of gas from said exhaust pipe, to draw the heated air from said exhaust manifold into and through the conduit.

7. In an engine driven vehicle including a water cooled internal combustion engine having a rearwardly extending transmission, a driving compartment having a floor wall and a vertically extending wall at the rear of the engine, a muffler, and an exhaust pipe extending rearwardly from the engine exhaust manifold to said muffler; a conduit extending below said floor wall and offset to one side of said transmission, said conduit directly surrounding and following the exhaust pipe and muffler and having an inlet positioned to receive heated air from the immediate vicinity of the exhaust manifold but leaving the main body of the engine openly exposed beyond said inlet, and said conduit being of substantially uniform diameter between the muffler and said inlet, and means for inducing suction within said conduit by virtue of the discharge of gas from said exhaust pipe, to draw the heated air from said exhaust manifold into and through the conduit.

8. In an engine driven vehicle including a water cooled internal combustion engine having a rearwardly extending transmission, a driving compartment having a floor wall and a vertically extending wall at the rear of the engine, a muffler, and an exhaust pipe extending rearwardly from the engine exhaust manifold to said muffler; a conduit extending below said floor wall and offset to one side of said transmission, said conduit directly surrounding and following the exhaust pipe and muffler and having an enlarged inlet positioned toward the rear of the exhaust manifold to receive heated air drawn longitudinally of the manifold, the main body of the engine being openly exposed beyond said inlet, and means for inducing suction within said conduit by virtue of the discharge of gas from said exhaust pipe, to draw the heated air from said exhaust manifold into and through the conduit.

JOHN S. FLUOR, Jr.

CERTIFICATE OF CORRECTION.

Patent No. 2,138,001.                                    November 29, 1938.

JOHN S. FLUOR, JR.

It is hereby certified that error appears in the printed specification of the above numbered patent requiring correction as follows: Page 3, first column, line 40, claim 5, for "opening" read openly; and that the said Letters Patent should be read with this correction therein that the same may conform to the record of the case in the Patent Office.

Signed and sealed this 10th day of January, A. D. 1939.

Henry Van Arsdale (Seal)                                                   Acting Commissioner of Patents.

the walls of said compartment and directly surrounding and following the exhaust pipe, said conduit having an air inlet positioned to receive heated air from the immediate vicinity along the exhaust manifold without directing air against the engine and leaving the main body of the engine openly exposed beyond said inlet, and means for communicating suction to said conduit to draw the heated air from said exhaust manifold into and through the conduit.

4. In an engine driven vehicle including a water cooled internal combustion engine, a driving compartment having a floor wall and a vertically extending wall at the rear of the engine, and an exhaust pipe extending rearwardly from the engine exhaust manifold; a conduit outside the walls of said compartment and directly surrounding and following the exhaust pipe, said conduit having an air inlet positioned at the rear of the exhaust manifold to receive heated air from the immediate vicinity along the exhaust manifold but leaving the main body of the engine openly exposed beyond said inlet, and means for inducing suction within said conduit by virtue of the discharge of gas from said exhaust pipe, to draw the heated air from said exhaust manifold into and through the conduit.

5. In an engine driven vehicle including a water cooled internal combustion engine, a driving compartment having a floor wall and a vertically extending wall at the rear of the engine, a muffler, and an exhaust pipe extending rearwardly from the engine exhaust manifold to said muffler; a conduit outside the walls of said compartment and directly surrounding and following the exhaust pipe and muffler, said conduit having an air inlet positioned to receive heated air from the immediate vicinity of the exhaust manifold but leaving the main body of the engine opening exposed beyond said inlet, and means for inducing suction within said conduit by virtue of the discharge of gas from said exhaust pipe, to draw the heated air from said exhaust manifold into and through the conduit.

6. In an engine driven vehicle including a water cooled internal combustion engine having a rearwardly extending transmission, a driving compartment having a floor wall and a vertically extending wall at the rear of the engine, and an exhaust pipe extending rearwardly from the engine exhaust manifold; a conduit extending below said floor wall and offset to one side of said transmission, said conduit directly surrounding and following the exhaust pipe and having an inlet positioned to receive heated air from the immediate vicinity of the exhaust manifold but leaving the main body of the engine openly exposed beyond said inlet, and means for inducing suction within said conduit by virtue of the discharge of gas from said exhaust pipe, to draw the heated air from said exhaust manifold into and through the conduit.

7. In an engine driven vehicle including a water cooled internal combustion engine having a rearwardly extending transmission, a driving compartment having a floor wall and a vertically extending wall at the rear of the engine, a muffler, and an exhaust pipe extending rearwardly from the engine exhaust manifold to said muffler; a conduit extending below said floor wall and offset to one side of said transmission, said conduit directly surrounding and following the exhaust pipe and muffler and having an inlet positioned to receive heated air from the immediate vicinity of the exhaust manifold but leaving the main body of the engine openly exposed beyond said inlet, and said conduit being of substantially uniform diameter between the muffler and said inlet, and means for inducing suction within said conduit by virtue of the discharge of gas from said exhaust pipe, to draw the heated air from said exhaust manifold into and through the conduit.

8. In an engine driven vehicle including a water cooled internal combustion engine having a rearwardly extending transmission, a driving compartment having a floor wall and a vertically extending wall at the rear of the engine, a muffler, and an exhaust pipe extending rearwardly from the engine exhaust manifold to said muffler; a conduit extending below said floor wall and offset to one side of said transmission, said conduit directly surrounding and following the exhaust pipe and muffler and having an enlarged inlet positioned toward the rear of the exhaust manifold to receive heated air drawn longitudinally of the manifold, the main body of the engine being openly exposed beyond said inlet, and means for inducing suction within said conduit by virtue of the discharge of gas from said exhaust pipe, to draw the heated air from said exhaust manifold into and through the conduit.

JOHN S. FLUOR, Jr.

CERTIFICATE OF CORRECTION.

Patent No. 2,138,001. November 29, 1938.

JOHN S. FLUOR, JR.

It is hereby certified that error appears in the printed specification of the above numbered patent requiring correction as follows: Page 3, first column, line 40, claim 5, for "opening" read openly; and that the said Letters Patent should be read with this correction therein that the same may conform to the record of the case in the Patent Office.

Signed and sealed this 10th day of January, A. D. 1939.

Henry Van Arsdale (Seal) Acting Commissioner of Patents.